United States Patent [19]
Stickney et al.

[11] Patent Number: 5,881,340
[45] Date of Patent: Mar. 9, 1999

[54] COMPACT REPRODUCTION MACHINE INCLUDING A SEPARATELY FRAMED SELF ALIGNING CONTROL AND POWER SUPPLY MODULE

[75] Inventors: Thomas L. Stickney, Pittsford, N.Y.; John R. Yonovich, Seoul, Rep. of Korea

[73] Assignee: Xerox Corporation, Stamford, Conn.

[21] Appl. No.: 970,325

[22] Filed: Nov. 14, 1997

[51] Int. Cl.⁶ .......................... G03G 15/00; G03G 21/00
[52] U.S. Cl. .............................. 399/110; 399/90; 399/107
[58] Field of Search ................................ 399/90, 88, 107, 399/110, 111; 347/138, 152; 174/59

[56] References Cited

U.S. PATENT DOCUMENTS

| | | | |
|---|---|---|---|
| 5,049,946 | 9/1991 | Harada | 399/110 |
| 5,561,499 | 10/1996 | Setoriyama | 399/111 |
| 5,621,451 | 4/1997 | Sugiura et al. | 399/111 X |
| 5,621,541 | 4/1997 | Sakai et al. | 399/107 X |
| 5,784,671 | 7/1998 | Damji et al. | 399/110 |

*Primary Examiner*—Arthur T. Grimley
*Assistant Examiner*—Sophia S. Chen
*Attorney, Agent, or Firm*—Tallam I. Nguti

[57] ABSTRACT

A compact electrostatographic reproduction machine, including a platen for positioning a document sheet having an original image to be reproduced, and a plurality of separately framed, mutually aligning machine modules variously containing electrostatographic process elements and subassemblies. The plurality of machine modules includes an electronic control and power supply (ECS/PS) module having an image processing pipeline unit for managing and processing raw digitized images; a machine controller for providing logic control to the plurality of machine modules; power supply interconnect boards including a high voltage interconnect board for supplying high voltage power; and harnessless inter-module connectors located on the power supply interconnect boards for automatically making harnessless contact with corresponding contacts on non-ECS/PS modules of the plurality of machine modules upon assembly thereof into the reproduction machine, thereby eliminating a costly and time consuming need for wiring harnesses.

4 Claims, 4 Drawing Sheets

COMPACT REPRODUCTION MACHINE INCLUDING A SEPARATELY FRAMED SELF ALIGNING CONTROL AND POWER SUPPLY MODULE

RELATED CASE

This application is related to U.S. application Ser. No. 08/970,477 Attorney Docket NO. 97580 entitled "Compact Reproduction Machine Having Separately Framed and Mutually Aligning Modules" by same inventors filed on even date herewith.

BACKGROUND OF THE INVENTION

This invention relates to electrostatographic reproduction machines, and more particularly to a compact electrostatographic reproduction machine has no separate machine frame to which components are mounted, but which comprises separately framed, mutually aligning modules for enabling high level sourcing and quick non-specialized tools assembly and disassembly of the machine. Specifically, the present invention relates to such a machine including a separately framed self aligning control and power supply module.

Generally, the process of electrostatographic reproduction includes charging a photoconductive member to a substantially uniform potential so as to sensitize the surface thereof. A charged portion of the photoconductive surface is exposed at an exposure station to a light image of an original document being reproduced. Typically, hard copy jobs, each comprising of a set of sheets of original documents are held and automatically handled by a recirculating document handler to the exposure station. Document handlers used with electrostatographic reproduction machines frequently are provided with a recirculating mode whereby stacked documents are withdrawn individually and sequentially from an input holding tray, passed to the exposure station, and then are outputted back to the holding tray for subsequent recirculation in the previous manner. Some document handlers also invert the documents so that a duplex document may be imaged on both sides.

Exposing a document sheet fed for example by a document handler to the exposure station records an electrostatic latent image onto the photoconductive member. After the electrostatic latent image is recorded as such, the latent image is subsequently developed using a development apparatus by bringing a charged dry or liquid developer material into contact with the latent image. Two component and single component developer materials are commonly used. A typical two-component dry developer material has magnetic carrier granules with fusible toner particles adhering triobelectrically thereto. A single component dry developer material typically comprising toner particles only can also be used. The toner image formed by such development is subsequently transferred to a copy sheet, on which it is then heated and permanently fused in order to form a "hardcopy" of the original image.

Electrostatographic reproduction machines based on this process, whether digital or light lens, are now commonly used in business environments, and the trend is more and more towards their use as desktop or personal reproduction machines or copiers. Conventionally, such digital and light lens electrostatographic reproduction machines contain selective electrostatographic components or subsystems that are designed for mounting to a unitary machine frame in order to assure rigidity and subsystem to subsystem alignment. Typically, such a machine and its unitary frame is produced and integrated by one producer, even if some of its subsystems are produced by others for such subsequent integration. Invariably, some of the most each subsystem is likely to be lost when mounting, aligning and integration is carried out by another. It is therefore difficult to optimize the technical and operational quality, the total cost and the machine delivery time for such machines.

There is therefore a need for a compact electrostatographic reproduction machine that is comprised of separately framed modules that are each designed and supplied as self-standing, specable (i.e. separately specified with interface inputs and outputs), testable, and shippable module units, and that is specifically partitioned for enabling operative integration of all the critical electrostatographic functions, upon mere assembly without resort to subsequent alignment and adjustments. Advantageously, each such self-standing, specable, testable, and shippable module unit specifically allows for high level sourcing of the units to a small set of module-specific skilled production suppliers, thus optimizing the technical and operative quality, the total cost, and the time of delivering of the final product, the machine.

SUMMARY OF THE INVENTION

In accordance with the present invention, there is provided a compact electrostatographic reproduction machine, including a platen for positioning a document sheet having an original image to be reproduced, and a plurality of separately framed, mutually aligning machine modules variously containing electrostatographic process elements and subassemblies. The plurality of machine modules includes an electronic control and power supply (ECS/PS) module having an image processing pipeline unit for managing and processing raw digitized images; a machine controller for providing logic control to the plurality of machine modules; power supply interconnect boards including a high voltage interconnect board for supplying high voltage power; and harnessless inter-module connectors located on the power supply interconnect boards for automatically making harnessless contact with corresponding contacts on non-ECS/PS modules of the plurality of machine modules upon assembly thereof into the reproduction machine, thereby eliminating a costly and time consuming need for wiring harnesses.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
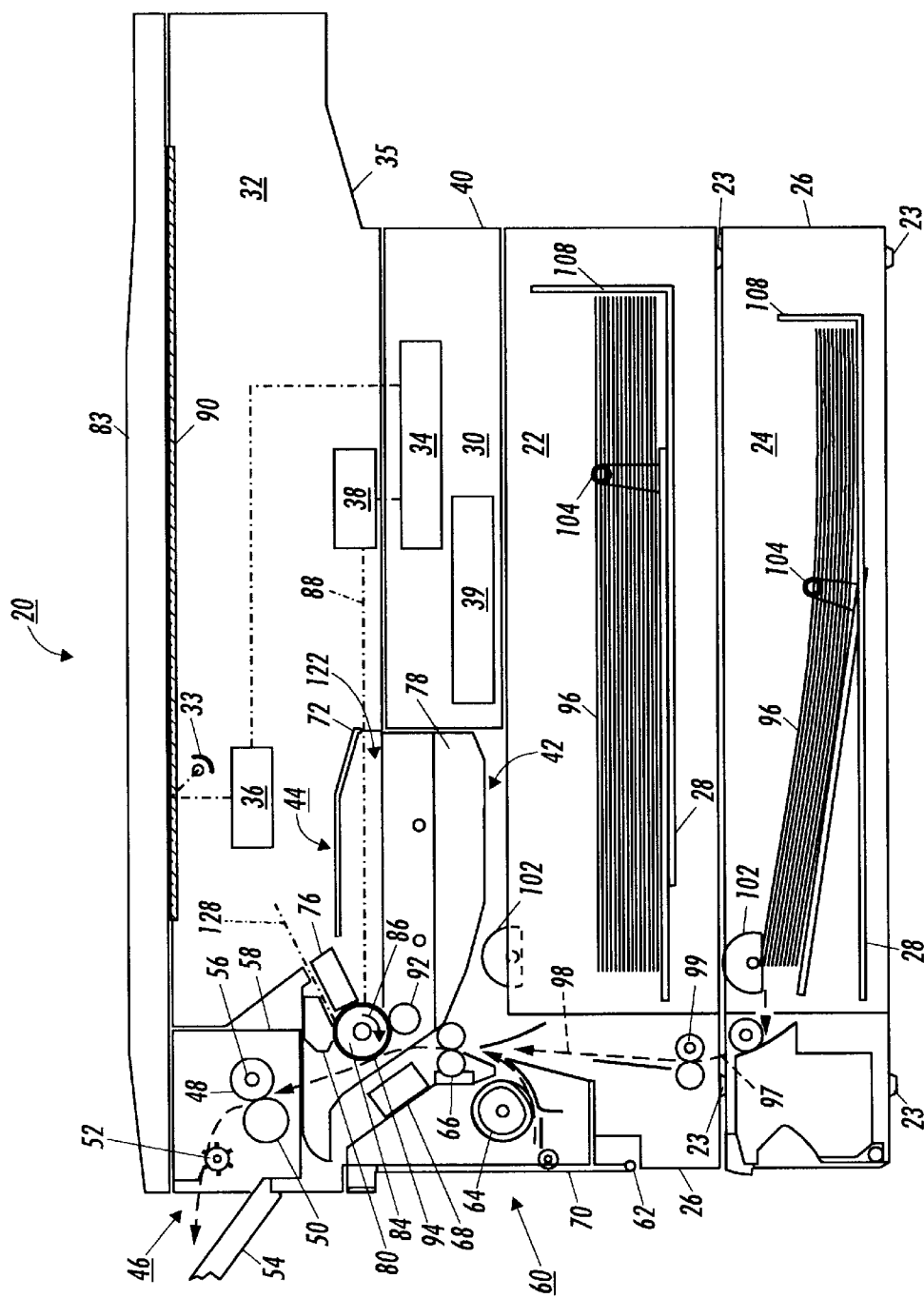
FIG. 1 is a front vertical illustration of an exemplary frameless compact electrostatographic reproduction machine comprising separately framed mutually aligning modules in accordance with the present invention.
Figure 2:
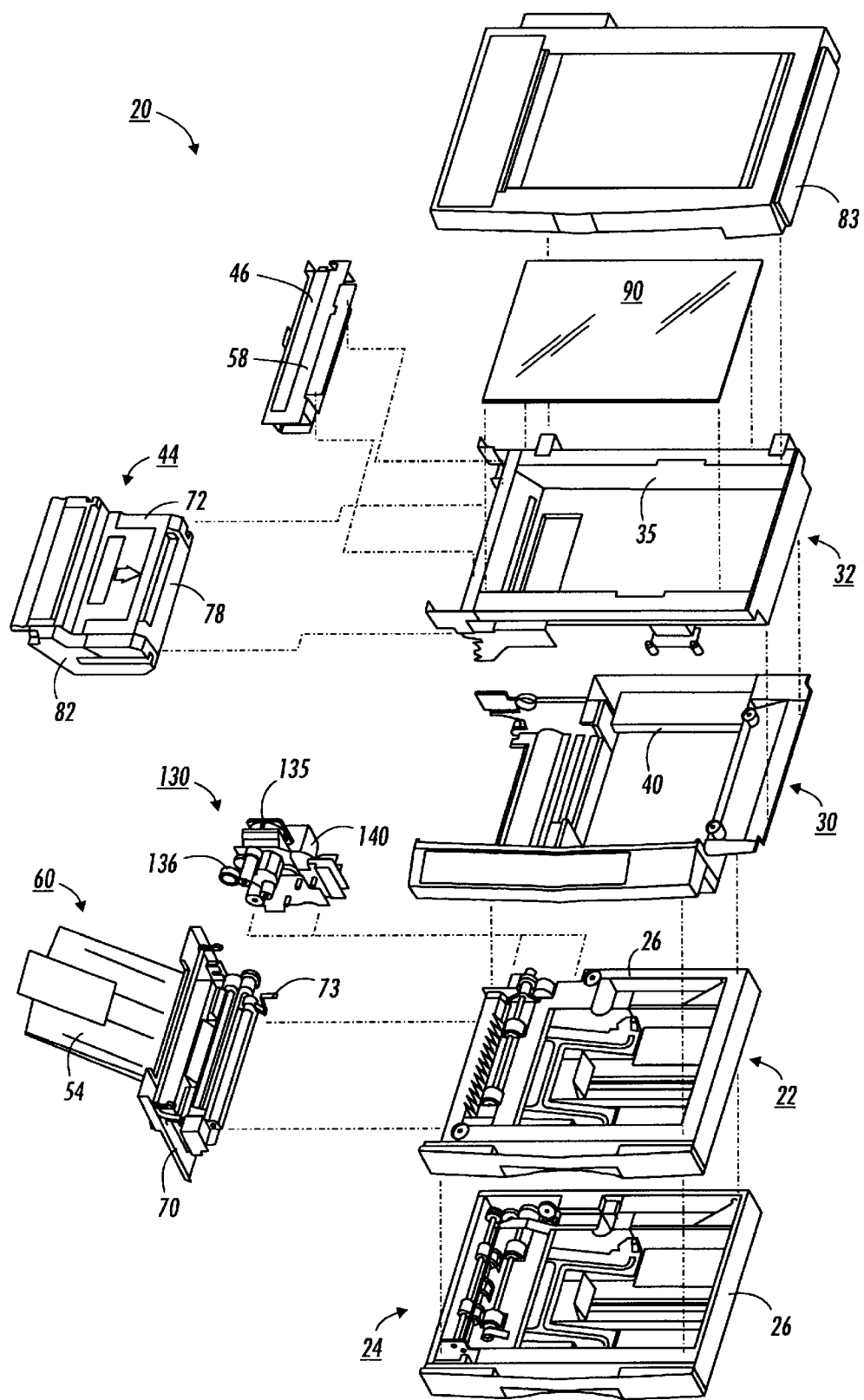
FIG. 2 is an exploded view of the separately framed and mutually aligning modules comprising the machine of FIG. 1.

Referring now to FIGS. 1 and 2, there is illustrated a frameless exemplary compact electrostatographic reproduction machine 20 comprising separately framed mutually aligning modules according to the present invention. The compact machine 20 is frameless, meaning that it does not have a separate machine frame to which electrostatographic process subsystems are assembled, aligned to the frame, and then aligned relative to one another as is typically the case in conventional machines. Instead, the architecture of the compact machine 20 is comprised of a number of individually framed, and mutually aligning machine modules that variously include pre-aligned electrostatographic active process subsystems.

As shown, the frameless machine 20 comprises at least a framed copy sheet input module (CIM) 22. Preferably, the machine 20 comprises a pair of copy sheet input modules, a main or primary module the CIM 22, and an auxiliary module the (ACIM) 24, each of which has a set of legs 23 that can support the machine 20 on a surface, therefore suitably enabling each CIM 22, 24 to form a base of the machine 20. As also shown, each copy sheet input module (CIM, ACIM) includes a module frame 26 and a copy sheet stacking and lifting cassette tray assembly 28 that is slidably movable in and out relative to the module frame 26, in order to enable its reloading with sheets of the paper. When as preferred here, the machine 20 includes two copy sheet input modules, the very base module is considered the auxiliary module (the ACIM), and the top module which mounts and mutually aligns against the base module is considered the primary module (the CIM).

More specifically, the sheet stacking and lifting cassette tray assembly 28 includes a D-shaped feedhead roller 102, and an adjustable sheet dimension guide member 104 movable from a rear end 108 of the tray 28 towards its front, for holding a stack of sheets 96 in alignment. In accordance with the present invention, the module frame 26 includes an outer cover, and thus serves as a base of the machine 20. The CIM 22 also includes drive coupling components, electrical connectors (not shown) for connecting to the ECS/PS module 30. As further shown, the ACIM 24 further comprises sheet an extension portion 97 including sheet advancing rollers 99 for advancing sheets fed from the ACIM to the common set of registration rollers 66, which then supply registered sheets from the CIM and ACIM to an image transfer point 94 on the photoreceptor or drum 84.

The main and auxiliary copy input sheet modules 22, 24 and the associated paper path extension 97 advantageously allows a "load-while-running" ability, meaning that an operator is able to load paper into one of them, while a job is running with paper being fed out of the other. Each copy sheet input module 22, 24 has a D-shaped forward buckle feedhead roller 102 energized via a solenoid (not shown) that is activated by a single revolution clutch (not shown), and is driven by the drives module 130. Each revolution of the D-shaped feedhead roller 102 corresponds to one sheet of paper being fed.

The machine 20 next comprises a framed electronic control and power supply (ECS/PS) module 30 in accordance with the present invention (to be described in detail below). As shown, the ECS/PS module mounts onto, and is mutually aligned against the CIM 22 (which preferably is the top or only copy sheet input module). The ECS/PS module 30 includes all controls and power supplies (to be described below) for all the modules and processes of the machine 20. It also includes a controller or ESS 39 and an image processing pipeline unit (IPP) 34 for managing and processing raw digitized images from a Raster Input Scanner (RIS) 36, as well as for generating processed digitized images for a Raster Output Scanner (ROS) 38. Importantly, the ECS/PS module 30 includes a module frame 40 having an external cover, to which the active components of the module as above are mounted, and which forms a covered portion of the machine 20, as well as locates, mutually aligns, and mounts to adjacent framed modules, such as the CIM 22 and the imager module 32.

The machine 20 also comprises the separately framed imager module 32, which mounts over, and mutually aligns against the ECS/PS module 30. As shown, the RIS 36, the ROS 38, a light source 33, and an imager module frame 35 comprise the imager module 32. The RIS 36 preferably is a full rate/half rate scanner with imaging optics and a CCD array (not shown separately), for converting hard copy images to electronic bit maps or digitized images. The imager module 32 includes electrical connection means (not shown) connecting the RIS 36 to an image processing unit (IPP) 34 for processing the digitized images. The imager module 32 has a platen 90 and a top cover 83 (FIG. 2) In accordance with the present invention, the imager module module frame 35 (to which the RIS 36 and ROS 38 are assembled), forms a covered portion of the machine 20 upon assembly, as well as locates to, mutually aligns with, and mounts to the ECS/PS module 30, and the other adjoining modules.

The framed copy sheet input modules 22, 24, the ECS/PS module 30, and the imager module 32, as mounted above, define a cavity 42. The machine 20 importantly includes a customer replaceable, all-in-one CRU or process cartridge module 44 that is insertably and removably mounted within the cavity 42, and in which it is mutually aligned with, and operatively connected to, the framed CIM, ECS/PS and imager modules 22, 30, 32. The CRU or process cartridge module 44 generally comprises a module housing subassembly 72, a photoreceptor 84 rotatable in the direction of the arrow 86, a charging subassembly 76, a developer subassembly 78 including a developer roll 92, a cleaning subassembly 80 for removing residual toner as waste toner from a surface of the photoreceptor, and a waste toner sump subassembly 82 for storing waste toner. The module housing subassembly 72 of the CRU or process cartridge module 44 importantly includes a first path 122 for receiving a ROS beam 88 onto the photoreceptor 84, and a second path for receiving an erase light 128 onto the photoreceptor.

As further shown, the machine 20 includes a framed fuser module 46, that is mounted above the process cartridge module 44, as well as adjacent an end of the imager module 32. The fuser module 46 comprises a pair of fuser rolls 48, 50, and at least an exit roll 52 for moving an image carrying sheet through, and out of, the fuser module 46 into an output or exit tray 54. The fuser module also includes a heater lamp 56, temperature sensing means (not shown), paper path handling baffles(not shown), and a module frame 58 to which the active components of the module, as above, are mounted, and which forms a covered portion of the machine 20, as well as locates mutually aligns, and mounts to adjacent framed modules, such as the imager module 32 and the process cartridge module 44.

As shown in FIG. 2, the machine 20 includes a separately framed drive module 130 that comprises a main drive motor (not shown) which is a Brushless DC motor, motor control board and interconnect boards (not shown), and a NOHAD (Noise, Ozone, Heat and Dust) fan assembly 135. It also includes a train 136 of all of the primary gears for transmitting mechanical power to various framed modules requiring drive, such as the process cartridge module 44, the door module 60, the CIM 22, and the fuser module 46. Importantly too, the drive module includes a module frame 140 having an external cover, which is a sheet metal frame, and to which the active components of the module as above are mounted. The module frame 140 forms a covered portion of the machine 20, locates to, mutually aligns with, and mounts to adjacent framed modules, such as the CIM 22, the imager module 32, the ECS/PS module 30, and the fuser module 46.

Figure 3:
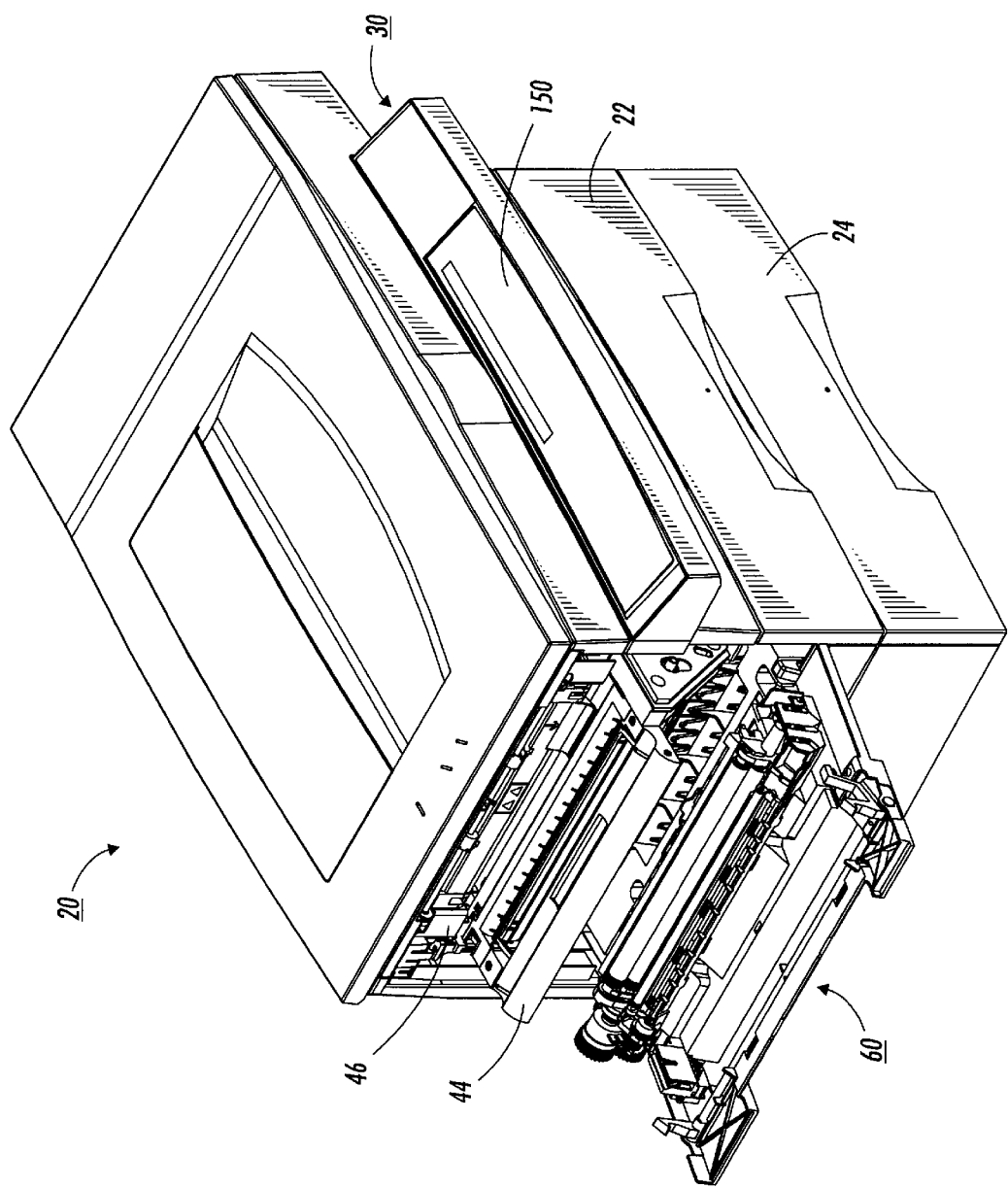
FIG. 3 is a vertical perspective view of the machine of FIG. 1 showing its User Interface portion of the Electronic Control and Power module, and its separately framed door module in the open position.

Referring now to FIGS. 1–3, the machine 20 then includes an active component framed door module 60, which is mounted pivotably at pivot point 62 to an end of the CIM 22. The door module 60 as mounted, is pivotable from a substantially closed vertical position into an open near-horizontal position (FIG. 3) in order to provide access to the process cartridge module 44, as well as for jam clearance of jammed sheets being fed from the CIM 22. The Door module 60 comprises active components including a bypass feeder assembly 64, sheet registration rolls 66, a toner image transfer and detack device 68, and the fused image output or exit tray 54. The door module 60 also includes drive coupling components and electrical connectors (not shown), and importantly, a module frame 70 with an external cover, to which the active components of the module as above are mounted, and which forms a covered portion of the machine 20, as well as, locates, mutually aligns, and mounts to adjacent framed modules, such as the CIM 22, the process cartridge module 44, and the fuser module 46. As further shown, the door module 60 is mounted pivotably to the CIM 22 at a pivot 62, such that it is openable for providing access to a portion of the copy paper path 98 (jam clearance) and to the process cartridge module 44 (for cartridge removal and replacement).

Figure 4:
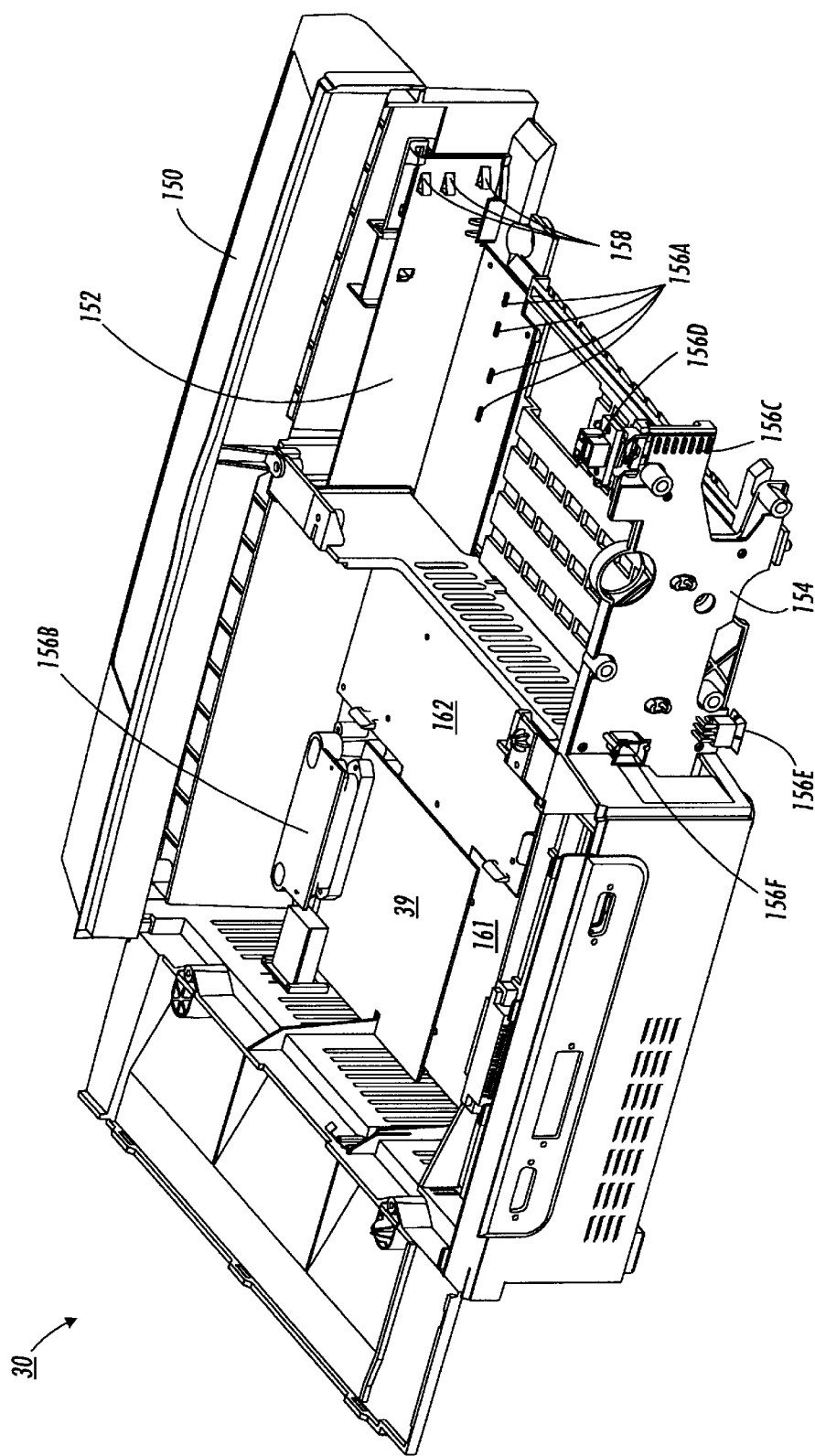
FIG. 4 is a perspective view of the Electronic Control and Power module of the machine of FIG. 1 in accordance with the present invention.

Referring in particular to FIGS. 1, 3 and 4, the ECS/PS module 30 is shown in greater detail. As shown, the ECS/Ps module includes the image processing pipeline unit (IPP) 34 for managing and processing raw digitized images from the RIS 36 (FIG. 1), and for generating processed digitized images for the ROS 38, the controller 39, and a User Interface (UI) 150. It also includes a harnessless high voltage power supply interconnect board 152, a harnessless low voltage power supply interconnect board 154. It further and advantageously includes harnessless inter-module connectors 156A for the process cartridge module 44; 156B for the imager module 32; 156C for the door module 60; 156D for the fuser module 46; 156E for the CIM/ACIM modules 22, 24; and 156F for the drive module 130. As shown, the ECS/PS module high voltage interconnect board 152 includes harnessless interconnects or connectors 158 for the transfer scorotron of the detack device 68 FIG. 1.

The harnessless inter-module connectors 156A–156F are connected to the controller 39, to a low voltage supply board 161, and to a high voltage supply board 162 for advantageously providing all power and logic paths to the respective modules of the machine 20. The interconnect boards 152, 154 connects the controller 39, and the power supply boards 161, 162, to the inter-module connectors 156A–156F. As shown, the inter-module connectors are located such that mating connectors on the other (non-ECS/PS modules) would automatically plug into the ECS/PS inter-module connectors 156A–156F during the final assembly of the machine 20. Importantly, the ECS/PS module 30 includes a module frame 40 with an external cover, to which the active components of the module as above are mounted, and which forms a covered portion of the machine 20, as well as locates, mutually aligns, and mounts to adjacent framed modules, such as the CIM 22 and the imager module 32.

The ECS/PS module 30 as such is a framed, self-contained module that includes the UI 150, and the complete electrical distribution and electronic control systems of all the modules of the machine 20. It effectively packages and mounts all of the machine controls, image processing, power supplies, power and logic distribution, as well as the UI together within the ECS/PS module frame 40. It does so in a manner such that it can be fully specified separately for intended integration or assembly with the other modules, thus enabling it to be designed and manufactured by a separate supplier. The benefits of this, framed, self-contained electronic control and power system (ECS/PS) module include reduced product cost, elimination of loose components, improved system reliability, and ease of assembly.

More specifically, the machine 20 is a desktop digital copier, and each of the modules 22, 24, 30, 32, 44, 48, 60, is a high level assembly comprising a self-containing frame and active electrostatographic process components specified for sourcing, and enabled as a complete and shippable product. It is believed that some existing digital and light lens reproduction machines may contain selective electrostatographic modules that are partitioned for mounting to a machine frame, and in such a manner that they could be designed and manufactured by a supplier. However, there are no known such machines that have no separate machine frame but are comprised of framed modules that are each designed and supplied as self-standing, specable (i.e. separately specified with interface inputs and outputs), testable, and shippable module units, and that are specifically crafted and partitioned for enabling all of the critical electrostatographic functions upon a simple assembly. A unique advantage of the machine 20 of the present invention as such is that its self-standing, specable, testable, and shippable module units specifically allow for high level sourcing to a small set of module-specific skilled production suppliers. Such high level sourcing greatly optimizes the quality, the total cost, and the time of delivering of the final product, the machine 20.

Successful vertical and final integration or assembly of the compact machine 20 starts with the Copy Input Modules, namely the CIM 22, and the ACIM 24. The ACIM 24 has a tray capacity of 250 sheets, and the main copy sheet input module preferably has a tray capacity of 500 sheets. Each however can handle a minimum sheet size of 8.5"×5.5", and maximum sheet size of 8.5"×14". Each can also handle sheet or paper weights within a range of 15 to 24 pound. The paper or sheet stacking and supporting tray assembly 28 of each sheet input module 22, 24, is slidable in and out relative to its integrated plastic molded frame 26, and is thus customer removable from the front of the machine 20 as assembled for reloading with sheets.

A paper or sheet when fed from the CIM 22, or the ACM 24, travels first to the set of registration rolls 66, where a sensor (not shown) detects the leading edge thereof. Detection of the leading edge of the sheet acts as a signal to the machine controller 39 to initiate document scanning. The registration rolls 66 then drive the paper or sheet through the transfer point 94 up to the fuser module 46 for fusing. The machine 20 is a center registered machine, meaning that the copy sheets are centered Inboard-to-Outboard in the paper path 98 of the machine. Such sheet registration is provided by the set of registration rollers 66, which form a stalled roll system, and comprise a soft high friction elastomer roll and a low friction hard steel roll that are coupled together with bearings, and are spring loaded. A wrap spring clutch (not shown) is attached to the driven shaft (not shown) of the elastomer roll.

Referring in particular to FIGS. 2 and 3, when the main or the main and auxiliary copy sheet input modules 22, 24, are set up and form a base to the compact machine 20, the door module 60 is then mounted pivotably to the pivot 62, on the CIM 22 to a left hand side thereof (relative to an operator facing the front side of the machine represented by the slidable paper trays 28 of the copy sheet input modules). The door module 60 is mounted as such so that it swings out and down from a closed position, as well as up and in to the closed and latched position (FIG. 3). When swung out and down into an open position, the door module provides access to a portion of the paper path 98 for jam clearance, as well as, access to the all-in-one CRU or process cartridge module 44. The arc (not marked) through which the door module 60 travels is preferably limited to 80 degrees by a tether 73 (FIG. 2) attached to the CIM 22 of the machine.

With particular reference to FIG. 1, operation of an imaging cycle of the machine 20 using the all-in-one process cartridge module 44 generally, can be briefly described as follows. Initially, a photoreceptor in the form of a photoconductive drum 84 of the customer replaceable unit (CRU) or process cartridge module 44, rotating in the direction of the arrow 86, is charged by the charging subassembly 76. The charged portion of the drum is then transported to an imaging/exposing light 88 from the ROS 38 which forms a latent image on the drum 84, corresponding to an image of a document positioned on a platen 90, via the imager module 32. It will also be understood that the imager module 32 can easily be changed from a digital scanning module to a light lens imaging module.

The portion of the drum 84 bearing a latent image is then rotated to the developer subassembly 78 where the latent image is developed with developer material such as with charged single component magnetic toner using a magnetic developer roller 92 of the process cartridge module 44. The developed image on the drum 84 is then rotated to a near vertical transfer point 94 where the toner image is transferred to a copy sheet substrate 96 fed from the CIM 22 or ACIM 24 along a copy sheet or substrate path 98. In this case, the detack device 68 of the door module 60 is provided for charging the back of the copy sheet substrate (not shown) at the transfer point 94, in order to attract the charged toner image from the photoconductive drum 84 onto the copy sheet substrate.

The copy sheet substrate with the transferred toner image thereon, is then directed to the fuser module 46, where the heated fuser roll 48 and pressure roll 50 rotatably cooperate to heat, fuse and fix the toner image onto the copy sheet substrate. The copy sheet substrate then, as is well known, may be selectively transported to the output tray 54 or to another post-fusing operation.

The portion of the drum 84 from which the developed toner image was transferred is then advanced to the cleaning subassembly 80 where residual toner and residual charge on the drum 84 are removed therefrom. The imaging cycle of the machine 20 using the drum 84 can then be repeated for forming and transferring another toner image as the cleaned portion again comes under the charging subassembly 76.

To recap, the machine 20 comprises framed, mutually aligning modules including a fixed platen, digital imager module 32; a main copy sheet input module 22; an auxiliary copy sheet input module 24, a pivoting door module 60 including a bypass copy sheet feeder 64; and an all-in-one electrostatographic CRU or process cartridge module 44. The pivoting door module 60 provides left side access to the all-in-one CRU or process cartridge module 44, as well as access for jam clearance from a paper path from the copy sheet input modules 22, 24. The main copy sheet input module 22 and auxiliary copy sheet input module 24 each have front access for copy sheet or paper loading. As such, the compact machine 20 is designed to be customer installable with no mechanical adjustments except for the frame 35 of the imager module 32. Importantly, the compact machine 20 adheres to Blue Angel and EPA Energy Star requirements.

As can be seen, there has been provided a frameless compact electrostatographic reproduction machine comprising separately framed and mutually self-aligning modules. The separately framed modules are each designed to a common set of physical and operatingly cooperating or mating specifications, and are independently tested and shipped in order to enable a final assembly of all of the modules without the need for any wiring harnesses between the modules, without special tools or realignment. This enables and reduces final assembly cost by combing the normally separate tasks of mechanical assembly and electrical harnessing, routing, tie-wrapping, and connection of such harnesses. The elimination of the above steps also improves final product quality by greatly reducing the potential for workmanship errors.

By making all of the modules as above, separately framed, independently specable, and independently testable and shippable, the potential for quality problems after each module has been shipped to a final assembly site is significantly reduced. This is because the functionality of each module can easily be preverified by each supplier at their site before shipment. The framed and mutually aligning modules thus advantageously enable a successful vertical, and final integration or assembly thereof into the machine 20 without any further adjustments, and without resort to special tools or tests. The above modules plus a short list of small parts and mechanical fasteners are all that are required to make up the complete digital copier or machine 20.

Advantageously too, mutual alignment and interconnection of the various other framed modules with the ECS/PS module 30 effectively eliminates undesirable use of electrical harnesses between modules, as well as eliminates any need for special tools or fixtures, or for additional mechanical adjustments during final assembly.

Further, the architecture is arranged to enable assembly of all of the modules without the need for any wiring harnesses between the modules. This enables and reduces final assembly cost by combining the normally separate tasks of mechanical assembly and electrical harnessing, routing, tie-wrapping, and connection of such harnesses. The elimination of these steps also improves product quality by greatly reducing the potential for workmanship errors.

As can be seen, there has been provided a compact electrostatographic reproduction machine, including a platen for positioning a document sheet having an original image to be reproduced, and a plurality of separately framed, mutually aligning machine modules variously containing electrostatographic process elements and subassemblies. The plurality of machine modules includes an electronic control and power supply (ECS/PS) module having an image processing pipeline unit for managing and processing raw digitized images; a machine controller for providing logic control to the plurality of machine modules; power supply interconnect boards including a high voltage interconnect board for supplying high voltage power; and harnessless inter-module connectors located on the power supply interconnect boards for automatically making harnessless contact with corresponding contacts on non-ECS/PS modules of the plurality of machine modules upon assembly thereof into the reproduction machine, thereby eliminating a costly and time consuming need for wiring harnesses.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A compact electrostatographic reproduction machine, comprising:
   (a) a platen for positioning a document sheet having an original image to be reproduced; and
   (b) a plurality of separately framed, mutually aligning machine modules variously containing electrostatographic process elements and subassemblies, said plurality of machine modules including an electronic control and power supply (ECS/PS) module having:
      (i) an image processing pipeline unit for managing and processing raw digitized images;
      (ii) a machine controller for providing logic control to said plurality of machine modules;
      (iii) power supply interconnect boards including a high voltage interconnect board for supplying high voltage power;
      (iv) a separate ECS/PS module frame and a user interface (UI) preassembled to said ECS/PS module frame; and
      (v) harnessless inter-module connectors located on said power supply interconnect boards for automatically making harnessless contact with corresponding contacts on non ECS/PS modules of said plurality of machine modules upon assembly thereof into the reproduction machine, thereby eliminating costly and time consuming need for wiring harnesses.

2. The reproduction machine of claim 1, wherein said ECS/PS module includes a separate ECS/PS module frame for mutually aligning against a separate frame of an adjacent module, said separate ECS/PS module frame including an external cover forming part of an exterior of the reproduction machine.

3. The reproduction machine of claim 1, wherein said power supply interconnect boards include a low voltage power supply board for supply low voltage power.

4. The reproduction machine of claim 1, wherein said harnessless inter-module connectors are connected to said controller, and to said power supply interconnect boards for advantageously providing all power and logic paths to said plurality of machine modules.

* * * * *